United States Patent
Mori et al.

(10) Patent No.: US 7,460,987 B2
(45) Date of Patent: Dec. 2, 2008

(54) GPS SATELLITE SIMULATION SYSTEM

(75) Inventors: Shinichiro Mori, Kawasaki (JP); Satoru Takagi, Osaka (JP)

(73) Assignee: Fujitsu Limited, Kawasaki (JP)

( * ) Notice: Subject to any disclaimer, the term of this patent is extended or adjusted under 35 U.S.C. 154(b) by 273 days.

(21) Appl. No.: 11/275,467

(22) Filed: Jan. 6, 2006

(65) Prior Publication Data

US 2006/0263755 A1  Nov. 23, 2006

Related U.S. Application Data

(63) Continuation of application No. PCT/JP2003/009099, filed on Jul. 17, 2003.

(51) Int. Cl.
*G06F 7/48* (2006.01)

(52) U.S. Cl. .............................. 703/6; 701/13; 701/213

(58) Field of Classification Search ..................... 703/2, 703/6–8, 22; 701/3, 13, 213–215; 434/111, 434/239
See application file for complete search history.

(56) References Cited

U.S. PATENT DOCUMENTS

| | | | |
|---|---|---|---|
| 5,757,786 A | 5/1998 | Joo | |
| 6,127,970 A * | 10/2000 | Lin | 342/357.14 |
| 6,735,523 B1 * | 5/2004 | Lin et al. | 701/216 |
| 6,760,582 B2 | 7/2004 | Gaal | |
| 6,813,596 B2 * | 11/2004 | Ellis et al. | 703/8 |
| 6,859,170 B2 * | 2/2005 | Devereux et al. | 342/357.06 |
| 7,039,098 B2 | 5/2006 | Younis | |

FOREIGN PATENT DOCUMENTS

| | | |
|---|---|---|
| JP | 3-251778 | 11/1991 |
| JP | 07-287083 | 10/1995 |
| JP | 11-304900 | 11/1999 |
| JP | 2001-027667 | 1/2001 |
| JP | 2001-272449 | 10/2001 |
| JP | 2002-228739 | 8/2002 |
| JP | 2003-28943 | 1/2003 |
| JP | 2004-506377 | 2/2004 |
| JP | 2005-525541 | 8/2005 |
| WO | 97/38326 | 10/1997 |
| WO | 99/63358 | 12/1999 |

OTHER PUBLICATIONS

Huntley et al., J. A Computer Simulation for a Space-Time Satellite Positioning System, Proceedings of the 23rd Annual Symposium on Simulation ANSS'90, Apr. 1990, pp. 99-103.*
Partial English Translation of Figures 2 and 3 in Japanese Patent Publication No. 2001-272449.
Office Action mailed on Aug. 5, 2008 and issued in coresponding Japanese Patent Application No. 2005-504370.

* cited by examiner

*Primary Examiner*—Russell Frejd
(74) *Attorney, Agent, or Firm*—Staas & Halsey LLP

(57) ABSTRACT

A simulation system for simulating a GPS (global positioning system) satellite is configured for acquiring a navigation data in real time from the GPS satellite, generating a simulation signal from the navigation data while carrying out a clock time synchronization with an output signal from the GPS satellite, and outputting the signal to a GPS receiver as a target of evaluation.

7 Claims, 4 Drawing Sheets

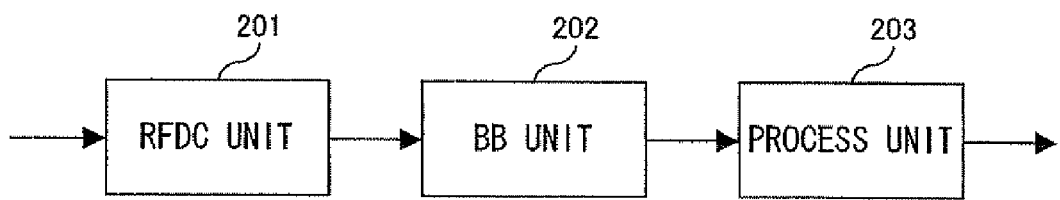
F I G. 2

GPS SATELLITE SIMULATION SYSTEM

CROSS REFERENCE TO RELATED APPLICATION

This application is a continuation application of International PCT Application No. PCT/JP2003/009099 which was filed on Jul. 17, 2003.

BACKGROUND OF THE INVENTION

1. Field of the Invention

The present invention relates to a simulation system and method for simulating an artificial satellite (GPS satellite) used for a GPS (global positioning system).

2. Description of the Related Art

A conventional GPS simulator simulates GPS satellites by externally receiving GPS navigation data. The GPS navigation data is mainly obtainable from NASA (National Aeronautics and Space Administration), et cetera, through the Internet.

The GPS navigation data is mainly categorized into almanac and ephemeris data. The almanac data describes a parameter for figuring out approximate locations of all the GPS satellites and can be used for about two weeks. The time limit is governed by the orbits of the respective GPS satellites changing with time and is corresponding to the effective period of the navigation data.

Meanwhile, the ephemeris data is the one describing a detailed parameter of satellite orbital information about each satellite and is used for a GPS module (GPS receiver), etcetera, calculating the position of each satellite. The time limit of the ephemeris data is about two hours.

A common use of the GPS simulator is to utilize a method for synthesizing a navigation data by itself mainly from information of the almanac data to simulate a GPS radio wave ("GPS wave" hereinafter). It is also possible to operate a simulator by using the ephemeris data.

When evaluating the GPS module by using such a GPS simulator, the simulator is connected with the GPS module which receives a navigation data synthesized by the simulator and thereby calculates the current position. Positional information of a positioning point is inputted to the simulator in advance, a performance of the GPS module can be evaluated by comparing information about the positioning point outputted from the GPS module with the information about the positioning point inputted into the simulator.

The GPS simulator is capable of simulating many kinds of parameters such as the moving motion of a positioning point, an intensity of an emitted radio wave, and a multiple path, in addition to a parameter for comparing positions of the positioning point.

Recently there has been an increase in the number of mobile phones each equipped with a GPS module. Many of such GPS modules obtain navigation data from an alternative information source by way of the mobile phone communications line, rather than receiving it from the primary source, i.e., a GPS wave, thereby shortening the time for positioning itself (e.g., refer to a patent document 1).

Patent Document 1

Japanese patent application publication No. 2002-228739

There is also a system to figure out an approximate position of a mobile phone according to the positional information about a base station with which the mobile phone is communicating and to notify, by way of the communications line, the GPS module equipped in the mobile phone of the complement information about a GPS satellite. This system also contributes to shortening the time for positioning.

Such a positioning method is generally called a network assisted GPS system in which a GPS module equipped in a mobile phone and an assist server on a network side measure a position while the two synchronize with each other. A GPS module is also mounted on the assist server of course, obtaining GPS information from the GPS satellite continuously. Therefore, the GPS module equipped in the mobile phone is enabled to obtain a navigation data, et cetera, from the assist server by way of the network.

Moreover, there is another known method for using a signal generated by a GPS signal generator within a GPS simulator to synchronize a signal of another unit with the generated signal (e.g., refer to a patent document 2).

Patent Document 2

Japanese patent application publication No. 11-304900

In the meantime, a signal from the GPS satellite includes a pulse signal, once every one second, which is called a 1 PPS (pulse per second) signal. The signal is extremely accurate because it is generated by an atomic clock comprised by the GPS satellite. There is yet another known method for providing a precision clock time, in a clock time synchronizer apparatus using such a 1 PPS signal, by creating 1 PPS signals by two clocks having different clock times respectively, comparing these 1 PPS signals by a comparator and thereby feeding back the difference (e.g., refer to a patent document 3).

Patent Document 3

Japanese patent application publication No. 07-287083

A GPS module evaluation system by using the conventional GPS simulator is unable to measure a position accurately unless a GPS module mounted on a mobile phone operating by receiving a GPS wave emitted from the simulator synchronizes with a server which is receiving a GPS wave from a GPS satellite to be actually used. The conventional network assisted GPS system, however, has not provided a method for synchronizing the GPS module equipped with the mobile phone with the assist server accurately.

SUMMARY OF THE INVENTION

An object of the present invention is to provide a GPS satellite simulation system and method for enabling a GPS module as a target of evaluation to synchronize with an assist server accurately for evaluating the GPS module in a network assisted GPS system.

A simulation system according to the present invention, comprising a navigation data acquisition unit and a simulator unit, simulates a GPS satellite. The navigation data acquisition unit acquires a navigation data in real time from the GPS satellite. The simulator unit generates a simulation signal for simulating the GPS satellite from the navigation data and outputs the simulation signal while synchronizing a clock time with an output signal coming from the GPS satellite.

Such a system is capable of outputting a navigation data obtained from a GPS satellite in real time as a simulation signal in synchronous with an output signal from the GPS satellite. Thus, a simulation signal accurately in synchrony with an actually used satellite can be obtained.

A supply of this simulation signal to the GPS module as a target of evaluation puts the aforementioned GPS module in a precise synchronism with the assist server. Therefore, it is possible to operate the GPS module in a state closer to the actual operation in the evaluation system.

BRIEF DESCRIPTION OF THE DRAWINGS

FIG. 2 shows a configuration of a GPS module.

DESCRIPTION OF THE PREFERRED EMBODIMENTS

The following is a detailed description of the preferred embodiment of the present invention while referring to the accompanying drawings.

The present embodiment uses a GPS simulator taking the following three points into consideration in order to synchronize a GPS module as a target of evaluation with the assist server:

(1) a navigation data from a GPS satellite;
(2) a clock signal from the GPS satellite; and
(3) a clock time information from the GPS satellite.

An acquisition of the above three pieces of information from the real satellite in real time to input to the GPS simulator enables the simulator to simulate the GPS satellite right in the position continuously and to be synchronized with the real satellite. Therefore, it is possible to synchronize the GPS module operating by receiving a GPS wave from the simulator with the server receiving the GPS wave from the real satellite.

Figure 1:
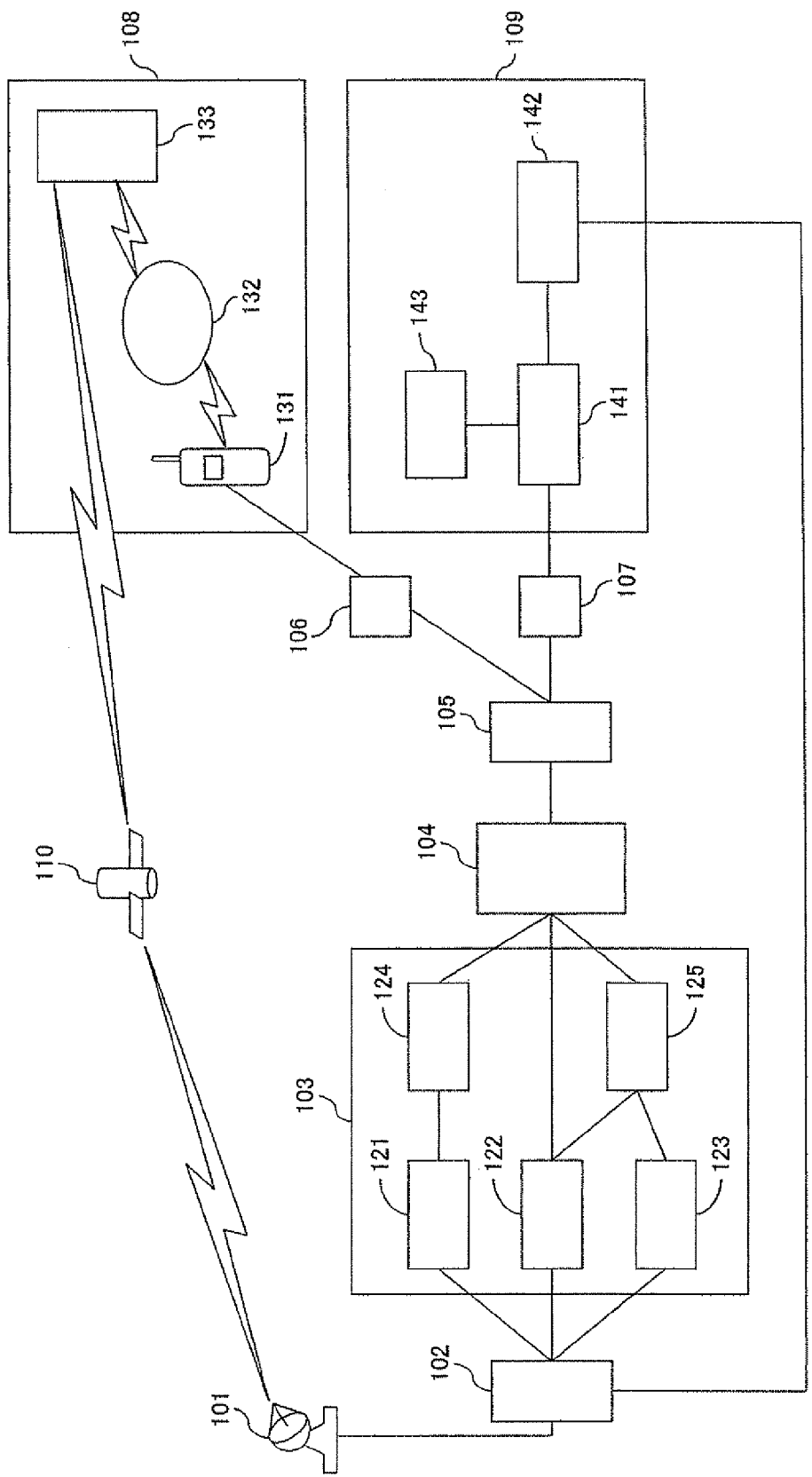
FIG. 1 shows a configuration of a synchronization system.

FIG. 1 is a configuration of such a synchronization system. The synchronization system shown by FIG. 1 comprises a GPS antenna 101, splitters 102 and 105, an integrated environment 103, a GPS simulator 104, DC (direct current) blocks 106 and 107, GPS evaluation systems 108 and 109, and a GPS satellite 110.

The integrated environment 103 includes a navigation data acquisition module 121, a clock generation module 122, a clock time acquisition module 123, a computer 124 and a clock time synchronizer board 125. The computer 124 and the GPS simulator 104 are connected by a LAN (local area network) so as to enable a data transmission between the two through an FTP (file transfer protocol).

The assist GPS evaluation system 108 includes a mobile phone 131, wireless network 132 and an assist server 133, while the local GPS evaluation system 109 includes GPS modules 141 and 142, and a computer 143. A wiring connecting between the splitter 105 and mobile phone 131, and the one connecting between the splitter 105 and GPS module 141, use the same cable and connector/adaptor.

The synchronization system shown by FIG. 1 operates as follows.

(1) A GPS wave received by way of the antenna 101 from the currently used GPS satellite is distributed to the navigation data acquisition module 121, clock generation module 122 and clock time acquisition module 123 by the splitter 102.

(2) The navigation data acquisition module 121 extracts a navigation data (including ephemeris data) of the GPS satellite 110 from the GPS wave to transmit to the computer 124. The computer 124 converts the navigation data to a simulation-use data to be used by the GPS simulator 104. The navigation data acquisition module 121 acquires navigation data every half an hour, for instance, to transmit to the GPS simulator 104.

(3) The clock generation module 122 extracts a 10 MHz synchronous signal and 1 PPS signal generated by the GPS satellite 110 from the GPS wave and supplies the GPS simulator 104 with the 10 MHz synchronous signal as a clock signal while supplying the clock time synchronizer board 125 with the 1 PPS signal.

(4) The clock time acquisition module 123 detects clock time information of the GPS satellite 110 from the GPS wave and supplies the clock time synchronizer board 125 with the clock time information.

(5) The operator sets an operation start clock time to the clock time synchronizer board 125 and GPS simulator 104 in advance, and sets options for external navigation data use and external synchronization start of the GPS simulator 104 as "active".

(6) The clock time synchronizer board 125 generates a trigger signal based on the set operation start clock time and clock time information from the clock time acquisition module 123 and outputs the trigger signal to the GPS simulator 104 as a synchronization trigger signal in time with the 1 PPS signal from the clock generation module 122.

(7) A clock time synchronization between the GPS satellite 110 and GPS simulator 104 is accomplished by the synchronization trigger signal outputted from the clock time synchronizer board 125. Subsequently, the GPS simulator 104 continues the synchronizing operation by using the 10 MHz clock signal from the clock generation module 122 as an external synchronous signal. As a result of this, a simulation signal precisely synchronized with the GPS satellite 110 is outputted from the GPS simulator 104.

(8) The splitter 105 distributes the simulation signal outputted from the GPS simulator 104 to the GPS evaluation systems 108 and 109. An antenna-use DC output (DC component) from the GPS module mounted in the mobile phone 131, and the one from the GPS module 141, are cut by the DC blocks 106 and 107, respectively, so as not to reach the splitter 105.

(9) At the GPS evaluation system 108, the assist server 133 receives a GPS wave from the GPS satellite 110 and creates information for assisting a positional measurement to be carried out by the mobile phone 131. The mobile phone 131 measures a position by using the simulation signal coming from the GPS simulator 104 in lieu of a GPS wave while acquiring the necessary information from the assist server 133 by way of the wireless network 132.

(10) At the GPS evaluation system 109, the GPS module 142 acquires a GPS wave by way of the splitter 102 to create information for assisting the GPS module 141 measuring the position. The GPS module 141, being controlled by the computer 143, measures a position by using the simulation signal coming from the GPS simulator 104 in lieu of a GPS wave while acquiring the necessary information from the GPS module 142.

The GPS modules 141 and 142 shown by FIG. 1, and the one mounted in the mobile phone 131 are configured as shown by FIG. 2 for example. The navigation data acquisition module 121, clock generation module 122 and clock time acquisition module 123, all shown by FIG. 1, are accomplishable by the same configuration.

The GPS module shown by FIG. 2 comprises a radio frequency down converter (RFDC) unit 201, a base band (BB) unit 202 and a process unit 203. The RFDC unit 201 converts an input signal into a signal of intermediate frequency (IF) band to output to the BB unit 202. The BB unit 202, including a correlator, extracts the necessary information such as navigation data from an input signal and transfers it to the process unit 203.

The process unit 203, including a CPU (central processing apparatus) and a memory, carries out an arithmetic logical operation for a positional measurement by using the received information to output the operation result. The process unit 203 is also configured to output a part of the information received from the BB unit 202 selectively.

Figure 3:
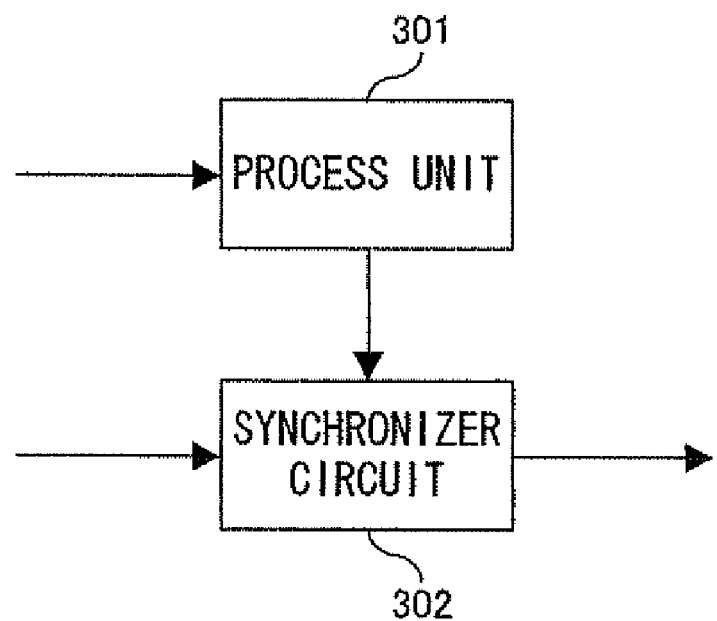
FIG. 3 shows a configuration of a clock time synchronizer board.

FIG. 3 shows a configuration of the clock time synchronizer board 125 shown by FIG. 1. The clock time synchronizer board shown by FIG. 3 comprises a process unit 301 and a synchronizer circuit 302. The process unit 301, including a CPU and a memory, generates a trigger signal and output it to the synchronizer circuit 302 when the operation start clock time set by the operator matches clock time information inputted by the clock time acquisition module 123.

The synchronizer circuit 302, including an AND circuit, outputs a logical product of the trigger signal inputted by the process unit 301 and the 1 PPS signal inputted by the clock generation module 122 as a synchronization trigger signal. Therefore, a rising edge of the synchronization trigger signal matches that of the 1 PPS signal pulse.

Figure 4:
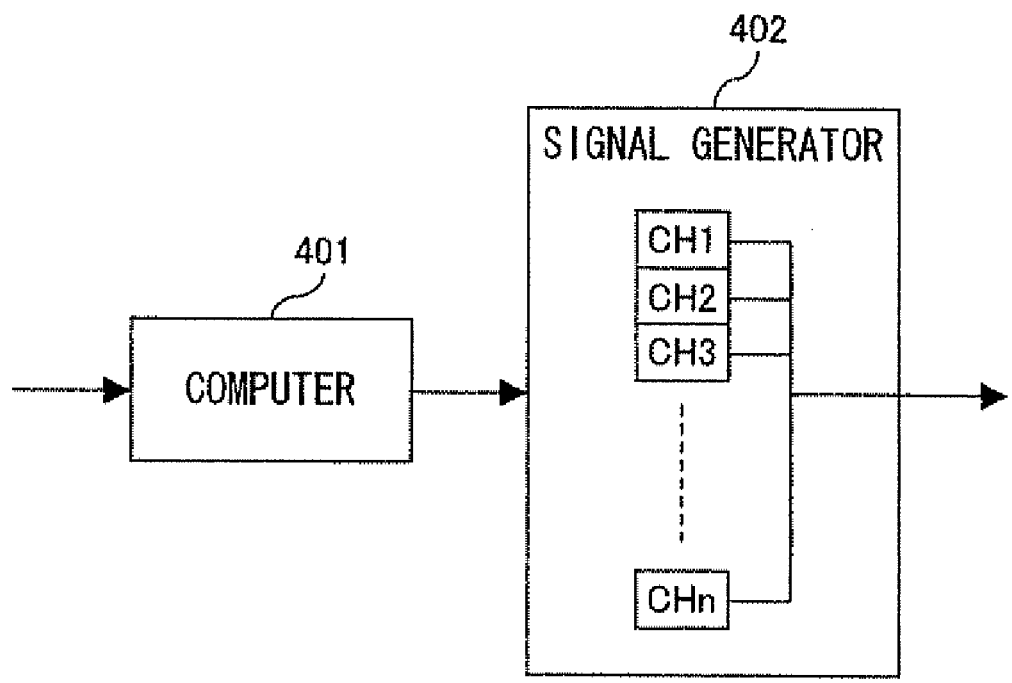
FIG. 4 shows a configuration of a GPS simulator.

FIG. 4 shows a configuration of the GPS simulator 104 shown by FIG. 1. The GPS simulator shown by FIG. 4 comprises a computer 401 and a signal generator 402.

The computer 401 controls an operation of the signal generator 402 by using the synchronization trigger signal from the clock time synchronizer board 125 and the clock signal from the clock generation module 122. The computer 401 first starts a control based on the synchronization trigger signal, and then generates output information based on a simulation-use data from the computer 124 and outputs it to the signal generator 402. Then, the computer 401 continues the control in synchronization with the 10 MHz clock signal.

The signal generator 402, having the function of generating a plurality of channel signals respectively different for the satellites, generates a simulation signal of RF band for simulating the GPS satellite 110 from the inputted output information.

The present invention enables a GPS module of the network assist GPS system and another GPS module to be mutually compared precisely by using the same GPS wave.

What is claimed is:

1. A simulation system for simulating a GPS satellite, comprising:
    a navigation data acquisition unit acquiring a navigation data in real time from the GPS satellite; and
    a simulator unit generating a simulation signal which simulates the GPS satellite from the navigation data and outputting the simulation signal while carrying out a clock time synchronization with an output signal from the GPS satellite.

2. The simulation system according to claim 1, further comprising a clock generation unit extracting a synchronization signal and a 1 PPS signal generated by said GPS satellite as the output signal from the GPS satellite and outputting the synchronization signal to said simulator unit as a clock signal.

3. The simulation system according to claim 2, further comprising a clock time acquisition unit acquiring clock time information from said GPS satellite and a clock time synchronization unit generating a synchronization trigger signal based on the clock time information and the 1 PPS signal, wherein said simulator unit starts an operation synchronous with the clock signal according to the synchronization trigger signal.

4. The simulation system according to claim 3, wherein said clock time synchronization unit outputs the synchronization trigger signal synchronous with the 1 PPS signal when the clock time information matches a preset operation start clock time.

5. A simulation method for simulating a GPS satellite, comprising:
    acquiring a navigation data in real time from the GPS satellite;
    generating a simulation signal for simulating the GPS satellite from the navigation data while carrying out a clock time synchronization with an output signal from the GPS satellite; and
    outputting the simulation signal to a GPS receiver.

6. The simulation method according to claim 5, comprising:
    extracting a synchronization signal generated by said GPS satellite as the output signal from the GPS satellite; and
    using the synchronization signal as a clock signal for simulation.

7. The simulation method according to claim 6, comprising:
    further extracting a 1 PPS signal generated by said GPS satellite as the output signal from the GPS satellite;
    acquiring clock time information from the GPS satellite;
    generating a synchronization trigger signal based on the clock time information and the 1 PPS signal; and
    starting an operation synchronous with the clock signal according to the synchronization trigger signal and generating the simulation signal.

* * * * *